US012511296B2

(12) United States Patent
LaPoff et al.

(10) Patent No.: US 12,511,296 B2
(45) Date of Patent: Dec. 30, 2025

(54) SYSTEM AND METHOD FOR PROVIDING ENHANCED RECOMMENDATIONS BASED ON RATINGS OF OFFLINE EXPERIENCES

(71) Applicant: Hinge, Inc., Dallas, TX (US)

(72) Inventors: Mitchell LaPoff, Brooklyn, NY (US); Julia Chesbrough, Brooklyn, NY (US); Lucy Mort, Brooklyn, NY (US); Sam Levy, Brooklyn, NY (US); Tim MacGougan, Brooklyn, NY (US); Jean-Marie McGrath, New York, NY (US); Justin McLeod, Brooklyn, NY (US)

(73) Assignee: Hinge, Inc., Dallas, TX (US)

( * ) Notice: Subject to any disclaimer, the term of this patent is extended or adjusted under 35 U.S.C. 154(b) by 399 days.

(21) Appl. No.: 16/597,564

(22) Filed: Oct. 9, 2019

(65) Prior Publication Data
US 2021/0109938 A1 Apr. 15, 2021

(51) Int. Cl.
G06F 7/00 (2006.01)
G06F 16/2457 (2019.01)
(Continued)

(52) U.S. Cl.
CPC .... G06F 16/24578 (2019.01); G06F 16/9535 (2019.01)

(58) Field of Classification Search
CPC .......... G06F 16/24578; G06F 16/9535; G06Q 50/10; G06Q 50/01; G06Q 50/30; G06N 20/00
See application file for complete search history.

(56) References Cited

U.S. PATENT DOCUMENTS 7,885,902 B1 2/2011 Shoemaker et al.
8,010,546 B2 * 8/2011 Terrill ................ G06F 16/3331
707/758
(Continued)

FOREIGN PATENT DOCUMENTS

CN 105141506 A 12/2015
CN 109784517 A 5/2019
(Continued)

OTHER PUBLICATIONS

PCT Notification of Transmittal of the International Search Report and the Written Opinion of the International Searching Authority, or the Declaration issued for International application No. PCT/US2020/054672—Dec. 16, 2020.
(Continued)

Primary Examiner — Tuan A Pham
(74) Attorney, Agent, or Firm — Baker Botts L.L.P.

(57) ABSTRACT

An apparatus includes an interface and a processor. The processor uses the interface to receive a first set of text from a first user and to transmit the first set of text to a second user. The processor determines, based at least in part on the first set of text, that the first user and the second user had an in-person meeting. The processor uses the interface to transmit a request to the first user for a first set of data. The first set of data includes information about the in-person meeting between the first user and the second user. The processor uses the interface to receive the first set of data from the first user. The processor determines, based on the first set of data, a score of the second user. The processor uses the interface to transmit a notification, based on the score, to the second user.

21 Claims, 4 Drawing Sheets

(51) Int. Cl.
  *G06F 16/9535* (2019.01)
  *G06F 17/00* (2019.01)

(56) References Cited

U.S. PATENT DOCUMENTS

| | | | |
|---|---|---|---|
| 9,355,358 B1* | 5/2016 | Kramer | G06N 5/04 |
| 10,417,613 B1* | 9/2019 | Brisebois | G06F 21/554 |
| 10,510,026 B1* | 12/2019 | Adamson | G06N 20/00 |
| 10,949,616 B1* | 3/2021 | Shenoy | G06F 40/295 |
| 2010/0125530 A1 | 5/2010 | Terrill et al. | |
| 2013/0218825 A1 | 8/2013 | Zhang et al. | |
| 2014/0074824 A1 | 3/2014 | Rad et al. | |
| 2014/0108333 A1* | 4/2014 | Jain | H04L 67/535 |
| | | | 707/609 |
| 2014/0164511 A1 | 6/2014 | Williams et al. | |
| 2014/0280582 A1* | 9/2014 | Aylesworth | H04L 51/52 |
| | | | 709/204 |
| 2015/0371196 A1 | 12/2015 | Lee | |
| 2016/0057246 A1 | 2/2016 | Krishnaiahsetty | |
| 2016/0148222 A1 | 5/2016 | Davar et al. | |
| 2016/0212230 A1* | 7/2016 | Schneider | G06Q 50/01 |
| 2017/0068906 A1* | 3/2017 | Korycki | G06N 20/00 |
| 2017/0109446 A1* | 4/2017 | Wu | G06F 16/358 |
| 2017/0300935 A1* | 10/2017 | Herbst | G06Q 30/0201 |
| 2017/0308589 A1* | 10/2017 | Liu | G06F 16/9535 |
| 2018/0367483 A1* | 12/2018 | Rodriguez | H04L 51/046 |
| 2019/0005461 A1 | 1/2019 | Soni et al. | |
| 2019/0182616 A1* | 6/2019 | Kamath | H04L 67/306 |
| 2019/0354910 A1* | 11/2019 | Escapa | G06Q 10/06312 |
| 2020/0082350 A1* | 3/2020 | Aagaard | G06Q 30/0282 |

FOREIGN PATENT DOCUMENTS

| | | |
|---|---|---|
| GB | 2 444 519 A | 6/2008 |
| JP | 2017016343 A | 1/2017 |

OTHER PUBLICATIONS

CNIPO—Notification of the First Office Action for Chinese Application No. 202080070786.8, Mailing Date Feb. 6, 2025 (Feb. 6, 2025), 9 pages [English Translation].

Notice of Allowance corresponding to Japanese Patent Application No. 2022-521652 dated Feb. 4, 2025, 6 pages with machine translation.

Korean Notice of Preliminary Rejection with machine translation corresponding to Korean Application No. 10-2022-7015538, dated Dec. 17, 2024, 12 pages.

India Patent Office, Official Hearing Notice in IN Application No. 202217016709 dated Oct. 3, 2025.

* cited by examiner

SYSTEM AND METHOD FOR PROVIDING ENHANCED RECOMMENDATIONS BASED ON RATINGS OF OFFLINE EXPERIENCES

TECHNICAL FIELD

This invention relates generally to the field of communications and, more particularly, to a system and method for recommending users based on ratings of offline experiences.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction. For example, certain network protocols may be used to allow an end user to connect online with other users who satisfy certain search requirements. These protocols may relate to job searches, person finding services, real estate searches, or online dating. In many instances, after connecting online; end users may agree to meet with one another offline.

SUMMARY

In a typical online recommendation system, profiles that include particular sets of attributes related to participants in the system may be used to facilitate matching. For example, in the online dating context, the profiles might include attributes such as age, education, and interests. A typical online recommendation system might provide algorithmic estimates of compatibility scores between pairs of participants by comparing various attributes from each participant's profile. Additionally, an online recommendation system may base recommendations on the similarity of users' matching histories. For example, if users A and B have both previously matched with users C, D, and E, and if user A subsequently matches with user F, the system may also present user F as a recommendation to user B, on the assumption that user B has a high probability of matching with user F, because of the similarity between user A's and user B's matching histories. Given that users of typical recommendation systems choose whether or not to match with recommended users based on the information contained in the recommended users' profiles, in both of the above situations, the online recommendation systems tend to rely on user profile information in forming recommendations.

While user profile information may help to facilitate matching among users in a recommendation system, this information does not necessarily provide a good indication of whether the matches formed between users in the system will lead to successful relationships outside of the system. For example, a pair of users may choose to match with one another on the system, based on the information contained in each other's profiles, but then one or both users may choose not to meet the other user offline, after the users chat with one another online. As another example, a pair of users who have matched with one another in the system may meet with one another offline, but then one or both users may choose not to engage in any further meetings. In either case, even though the system recommended the users to one another and the users both chose to match with one another in the system, the matches did not lead to a successful offline relationship between the users. This may be due to any number of reasons. For example, in the online dating context, one or both users may have poor dating skills, even though the users are in fact compatible with one another. As another example, one or both users may not have been honest in the information they provided to the system. For instance, one or both users may have intentionally tried to deceive the other users with the profile information that they provided to the system or may simply have painted themselves in an overly positive light. In either case, an inconsistency between a user's profile information and the user's real-life attributes may reveal itself during an in-person meeting, causing the other user to reject any further meeting requests. As a further example, the users may simply not have been compatible with one another, based on personality facets that may not have been captured in the profile information submitted by the users.

The fact that a pair of users who matched on the system nevertheless did not wish to pursue a relationship offline may be useful information for the recommendation system to know. For example, if a match proved unsuccessful because of poor dating skills of one of the users, the system could provide that user with dating tips to help improve his/her dating skills. As another example, if the match proved unsuccessful because of inaccurate profile information submitted by one of the users, the system could assist the user in correcting this inaccurate information. As a further example, if the match proved unsuccessful because the users simply were not compatible with one another, the system could integrate this additional information into the recommendation algorithm to increase the likelihood that future recommendations lead to both successful matches and successful in-person relationships. However, despite these potential uses/benefits, current online recommendation systems are typically unable to capture information about the offline dating experiences of users who have matched in the systems.

This disclosure contemplates a recommendation tool that addresses one or more of the above issues. The tool monitors conversations and other data between pairs of users who have matched in the system, to identify those pairs of users who likely met with one another offline (e.g., went on a date with one another). The tool then presents such users with a survey that is used to gather information about the meeting/date. For example, the survey may first ask the users to confirm that they did in fact meet one another. If the users met, the survey may ask the users to indicate whether the meeting was successful or unsuccessful, and why. If the users did not meet one another, the survey may ask the users to specify why not.

Based on the types of responses provided by the users, the system may use the information contained in the responses in a variety of different ways. For example, in certain embodiments in which a first user indicates that he/she did not meet with a second user because of poor conversation skills exhibited by the second user during an online conversation between the users, the system may send one or more conversation tips to the second user. As another example, in certain embodiments in which a first user indicates that he/she did in fact meet with a second user, but does not want to go on any future meetings with the second user because of poor dating skills exhibited by the second user or because the second user was different from what the first user was expecting, based on the information contained in the second user's profile, the system may send one or more dating tips and/or ways to improve profile information to the second user. As another example, in certain embodiments in which a first user indicates that he/she did in fact meet with a second user, but does not want to engage in any future meetings with the second user because he/she felt deceived by the information in the second user's profile, the system may provide the first user with an opportunity to report the second user based on this deceit. If the system determines that this deceit was real and intentional, the system may prevent the second user from receiving recommendations for any other users. As a further example, in certain embodiments in which a first user indicates that he/she did in fact meet with a second user but does not want to go on any future meetings with the second user because he/she simply does not feel that he/she is compatible with the second user, the system may incorporate this information into the recommendation algorithm used by the system to help increase the likelihood that future recommendations will lead to successful offline relationships. As an additional example, in certain embodiments in which both users indicate that they did in fact meet with one another and they both want to meet with one another again, in the future, the system may help the users in setting up a second meeting. Certain embodiments of the recommendation tool are described below.

According to an embodiment, a method includes receiving a first set of text from a first user. The method also includes transmitting the first set of text to a second user. The method additionally includes determining, based at least in part on the first set of text, that the first user and the second user had an in-person meeting. The method further includes transmitting a request to the first user for a first set of data. The first set of data includes information about the in-person meeting between the first user and the second user. The method also includes receiving the first set of data from the first user. The method additionally includes determining, based on the first set of data, a score of the second user. The method further includes transmitting a notification, based on the score, to the second user.

According to another embodiment, an apparatus includes an interface and a hardware processor. The interface sends and receives data over a network. The hardware processor uses the interface to receive a first set of text from a first user. The processor also uses the interface to transmit the first set of text to a second user. The processor additionally determines, based at least in part on the first set of text, that the first user and the second user had an in-person meeting. The processor further uses the interface to transmit a request to the first user for a first set of data. The first set of data includes information about the in-person meeting between the first user and the second user. The processor also uses the interface to receive the first set of data from the first user. The processor additionally determines, based on the first set of data, a score of the second user. The processor further uses the interface to transmit a notification, based on the score, to the second user.

Certain embodiments provide one or more technical advantages. For example, an embodiment may incorporate user feedback information into a machine-learning recommendation algorithm, thereby provided enhanced recommendations for users and accordingly decreasing the processing and bandwidth resources expended by the system in providing recommendations to a user, prior to the user matching with and forming a successful relationship with another user offline. As another example, an embodiment may provide dating and/or communication tips to those users who are unable to secure offline dates with their online matches. As another example, an embodiment may enable a user to report another user for violating the system's terms of service based on inaccurate/deceitful profile information provided to the system by the other user. As a further example, an embodiment may provide location/activity suggestions to help improve future in-person meetings. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

Figure 1:
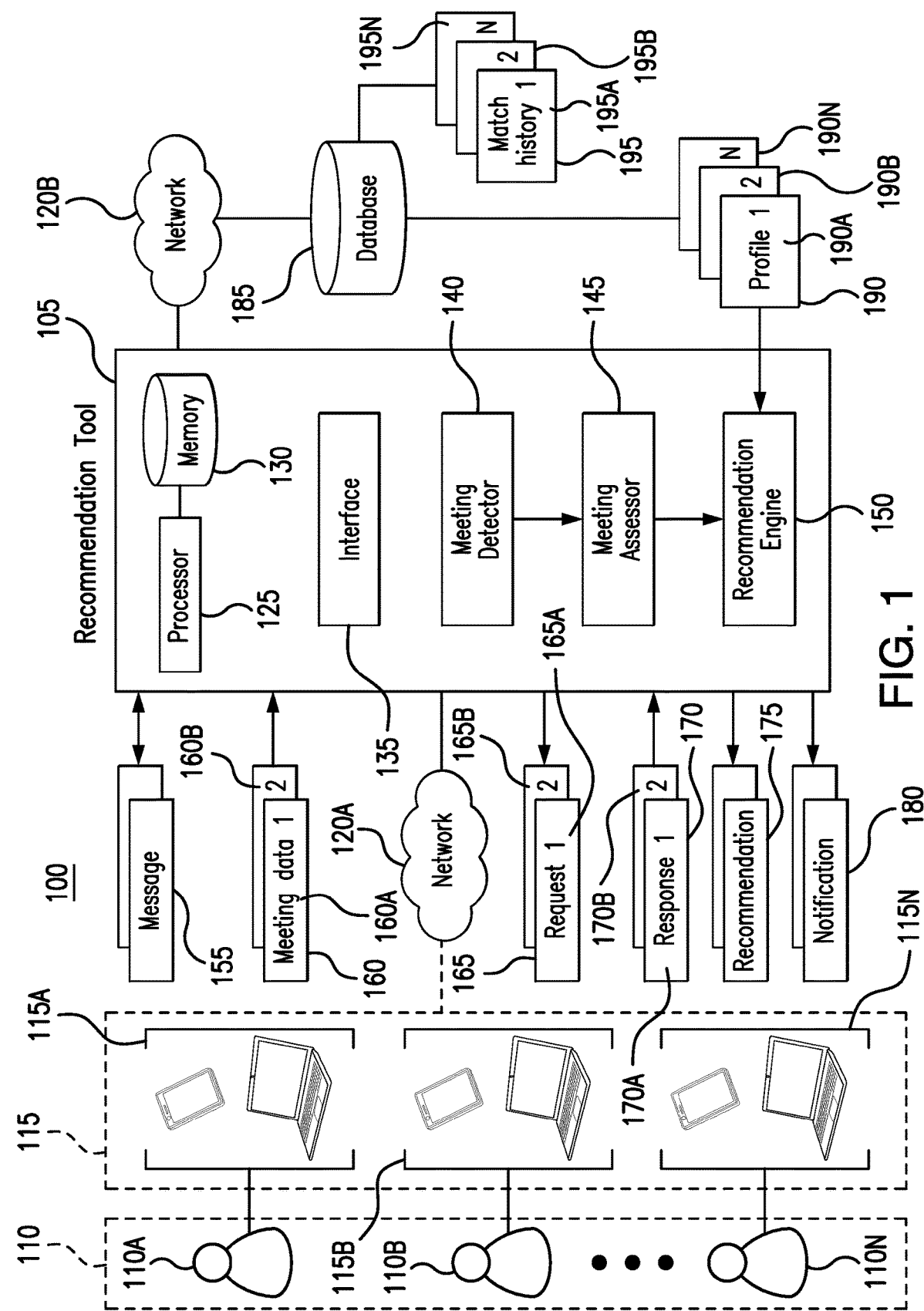
FIG. 1 illustrates an example system.

FIG. 1 illustrates an example system 100. As seen in FIG. 1, system 100 includes recommendation tool 105, user(s) 110, device(s) 115, network 120A, network 120B, and database 185. Generally, recommendation tool 105 monitors messages 155 transferred between pairs of users 110 to determine that the pairs of users 110 likely met in person. Recommendation tool 105 then solicits information from the pairs of users about their offline experiences (through requests 165), to determine if the meetings were or were not successful. If the meetings were successful, in certain embodiments, recommendation tool 105 may help users 110 to set up future meetings. If the meetings were unsuccessful, in certain embodiments, recommendation tool 105 may: (1) provide dating and/or communication tips 180 to one or both users; (2) assist one or both users in improving their profiles (for example, by soliciting additional/more accurate information from the users); (3) allow users to report other users for violating terms of service; and/or (4) transmit the information that the meeting was unsuccessful back into the system's recommendation algorithm to help improve future recommendations 175 provided by recommendation tool 105 (i.e., help to increase the likelihood that recommendations 175 will lead to successful dating relationships).

This disclosure contemplates that in certain embodiments, recommendation tool 105 may be configured to receive information submitted by users and to create profiles 190 for users 110 based on that information. This disclosure also contemplates that in some embodiments, recommendation tool 105 may operate on user profiles 190 that have been stored in database 185 by another system and/or tool.

This disclosure contemplates that in certain embodiments in which recommendation tool 105 uses responses 170 to provide improved recommendations 175, the recommendation algorithm used by recommendation engine 180 to generate recommendations 175 may operate solely on responses 170. For example, recommendation engine 180 may determine recommendations 175 for a user 110A, by comparing both the match history 190A and the offline experiences of user 110A (determined from responses 170A) to the match histories 190 and offline experiences (determined from responses 190) of other users 110. As a specific example, consider a situation in which first user 110A has a similar match history 195A to third user 110C, and both first user 110A and third user 110C have had similar offline dating experiences. For example, both first user 110A and third user 110C may have had successful dates with a first set of users 110 and unsuccessful dates with a second set of users 110. Continuing the example, if third user 110C subsequently indicates that he/she had a successful date with second user 110B, recommendation tool 105 may present second user 110B as a recommendation 175 to first user 110A. Here, recommendation tool 105 may operate on the assumption that the similarity between user 110A's and 110C's offline dating experiences suggests that user 110A may be likely have a successful date with second user 110B.

Alternatively, this disclosure contemplates that responses 170 may be used as a factor of a set of factors considered in a larger recommendation algorithm. For example, in certain embodiments, not only may users 110 submit information about themselves to recommendation tool 105 (i.e., information stored in profiles 190), users 110 may also submit preferred characteristics of other users with whom they are seeking to be matched to recommendation tool 105. In both cases, such information may include gender, preferred gender of a potential match, height, weight, age, location, ethnicity, birthplace, eating habits, activities, and goals. Additionally, users 110 may provide recommendation tool 105 with information indicating how important certain factors are when looking for a match. For example, users 110 may indicate which characteristics in a potential match are a necessity. As another example, recommendation tool 105 may ask users 110 to indicate, "How important is it that your match does not smoke?" Recommendation tool 105 may also allow users 110 to indicate that certain characteristics are not important search criteria. For example, user 110A may indicate to recommendation tool 105 that the weight and/or height of a potential match is not important. In certain embodiments, recommendation tool 105 may prompt users 110 to provide information to the tool. For example, recommendation tool 105 may require users 110 to answer a number of questions or provide a number of descriptions, prior to enabling the users to participate in the recommendation system.

In certain embodiments, recommendation tool 105 may be configured to determine recommendations 175 by searching through information contained in profiles 190, comparing match histories 195 between users 110, and extracting information about users' offline dating experiences from responses 170. Techniques for determining relevant recommendations for users 110 may include determining how closely one user's preferences match another user's characteristics/attributes and vice versa, taking into account match histories 195 and the offline dating experiences of users 110. For example, if recommendation tool 105 determines that a first user 110A's preferences strongly match a second user 110B's characteristics/attributes, but that multiple other users 110 who share similar match histories 195 and offline dating experiences to first user 110A have had unsuccessful dates with second user 110B, recommendation tool 105 may choose not to present second user 110B to first user 110A as a recommendation 175. On the other hand, if recommendation tool 105 determines that multiple other users 110 who share similar match histories 195 and offline dating experiences to first user 110A have had successful dates with second user 110B, recommendation tool 105 may then choose to present second user 110B to first user 110A as a recommendation 175. In some embodiments, recommendation tool 105 may be configured to generate a pool of recommendations 175 for user 110A according to various characteristics/attributes and preferences of user 110A and of other users of the system. Recommendation tool 105 may assign scores to the pool of recommendations for user 110A based on preferences and/or activity of user 110A, as well as match histories 195 and information about the offline experiences of users 110, participating in the system. Tool 105 may also restrict entities from being included in the pool of recommendations based on the status of the profile, location information regarding the entity, or location information regarding user 110A. In this manner, certain embodiments of tool 105 may provide a recommendation 175 of user 110B to user 110A based on both on the offline experiences of users 110A and 110B, as well as information provided by users 110A and 110B when setting up profiles 190A and 190B.

Devices 115 may be used by users 110 to send and receive messages 155. For example, user 110A may use device 115A to transmit message 155 to recommendation tool 105 (for ultimate receipt by user 110B), and user 110B may use device 115B to receive message 155 from recommendation tool 105 (and originating from user 110A). This disclosure contemplates that messages 155 may correspond to portions of an online conversation between user 110A and user 110B. This disclosure also contemplates that messages 155 may include text, video, pictures, or any combination of text, video, and/or pictures.

Devices 115 may also be used by users 110 to receive requests 165A and 165B. This disclosure contemplates that requests 165A and 165B may include surveys transmitted to users 110A and 110B by recommendation tool 105, seeking information about an in-person meeting that recommendation tool 105 determined likely took place between users 110A and 110B. For example, requests 165A and 165B may ask users 110A and 110B if they did, in fact, meet in person, and if so, if they intend to meet one another again. Depending on responses 170A and 170B received by recommendation tool 105 from users 110A and 110B, recommendation tool 105 may transmit additional questions to users 110A and 110B. For example, if user 110A indicates that he/she does not want to meet user 110B again, request 165A may ask user 110A to indicate why not.

In certain embodiments, devices 115 may also transmit meeting data 160A and 160B to recommendation tool 105, to assist recommendation tool 105 in determining that user 110A and user 110B likely met one another in person. This disclosure contemplates that meeting data 160A and 160B may include any information indicating that user 110A and user 110B likely had a meeting together at a physical location. For example, in certain embodiments, meeting data 160A and 160B may be GPS information, indicating that user 110A and user 110B were at approximately the same location at approximately the same time. As another example, in certain embodiments, meeting data 160A and 160B may include information submitted by user 110A and/or user 110B stating that user 110A and user 110B met with one another at a physical location.

In certain embodiments, devices 115 may receive notifications 180 transmitted by recommendation tool 105. In some embodiments, notifications 180 may contain tips on ways to improve communication skills, dating skills/techniques, and/or user profiles 190. In some embodiments, notifications 180 may include ideas for future dates and/or conversation topics. In certain embodiments, notifications 180 may be transmitted by recommendation tool 105 to device 115B of user 110B in response to information included in response 170A submitted by user 110A indicating that he/she had a successful offline experience with user 110B.

In certain embodiments, devices 115 may also receive recommendations 175. This disclosure contemplates that recommendations 175 may include profiles and/or profile information of other users 110 who are potentially compatible with user 110A, as determined by recommendation tool 105. In certain embodiments, recommendations 175 may be based entirely on responses 170 received from users 110. In some embodiments, recommendations 175 may be based in part on responses 170 as well as profiles 190 and/or match histories 195.

Devices 115 include any appropriate device for communicating with components of system 100 over network 120A. For example, device 115 may be or may be accompanied by a telephone, a mobile phone, a computer, a laptop, a tablet, a server, an automated assistant, and/or a virtual reality or augmented reality headset or sensor, or other device. This disclosure contemplates device 115 being any appropriate device for sending and receiving communications over network 120A. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein. In certain embodiments, devices 115 may communicate with recommendation tool 105 through network 120A via a web interface.

Networks 120A and 120B facilitate communication between and amongst the various components of system 100. This disclosure contemplates networks 120A and 120B being any suitable network operable to facilitate communication between the components of system 100. Networks 120A and 120B may include any interconnecting system capable of transmitting audio, video, signals, data, messages, or any combination of the preceding. Networks 120A and 120B may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates that in certain embodiments, network 120A and 120B correspond to the same network. This disclosure also contemplates that in some embodiments, network 120A and network 120B may correspond to different networks. For example, in certain embodiments, network 120A may be a global communication or computer network, such as the Internet, while network 120B may be a private data network used As seen in FIG. 1, recommendation tool 105 includes processor 125, memory 130, and interface 135. This disclosure contemplates processor 125, memory 130, and interface 135 being configured to perform any of the functions of recommendation tool 105 described herein. Generally, recommendation tool 105 implements meeting detector 140 and meeting assessor 145. In certain embodiments, recommendation tool 105 additionally implements recommendation engine 150.

This disclosure contemplates that meeting detector 140 may be used by recommendation tool 105 to determine that an in-person meeting likely took place between a first user 110A and a second user 110B. This disclosure contemplates that meeting detector 140 may determine that an in-person meeting likely took place between first user 110A and second user 110B in any suitable manner. For example, in certain embodiments, meeting detector 140 may monitor messages 155 exchanged between users 110A and 110B, to determine that user 110A and user 110B likely met with one another in person. This disclosure contemplates that messages 155 may be exchanged by users 110A and 110B through recommendation tool 105, in response to users 110A and 110B choosing to match with one another after being presented with recommendations 175 of one another by recommendation tool 105. Accordingly, this disclosure contemplates that messages 155 transmitted by user 110A and destined for user 110B are first received by interface 135, which then transmits them to device 115B of user 110B. In certain embodiments, interface 135 may provide meeting detector 140 with access to messages 155 before transmitting messages 155 to user 110B. In some embodiments, interface 135 may store copies of messages 155, which meeting detector 140 may then access.

This disclosure contemplates that meeting detector 140 may use messages 155 to determine that user 110A and user 110B likely met with one another in person in any suitable manner. For example, in certain embodiments, meeting detector 140 may determine that user 110A and user 110B likely met with one another in person, based in part on identifying a phone number in messages 155. For example, meeting detector 140 may examine messages 155 and determine that a message 155 contains a string of numerical digits with the format XXX-XXX-XXXX, (XXX) XXX-XXXX, XXX-XXXX, or any other similar format of digits that may comprise contact information. As another example, recommendation tool 105 may examine messages 155 and determine that a message 155 contains a word or phrase associated with a contact-information exchange, such as "call me," "my number is," "my phone number," or any other suitable phrase that may be associated with a contact-information exchange. In certain embodiments, in response to determining that user 110A and user 110B likely exchanged contact information, meeting detector 140 may determine that user 110A and user 110B are likely planning to meet one another. Meeting detector 140 may further determine that user 110A and user 110B likely had the meeting with one another by waiting a set number of days after the suspected contact-information exchange, during which time the meeting may take place. For example, in certain embodiments, meeting detector 140 may determine that user 110A and user 110B likely met with one another offline, by identifying a probable phone number exchange between user 110A and user 110B on a first day, and then waiting for a period of five days to pass.

As another example, in certain embodiments, meeting detector 140 may determine that user 110A and user 110B likely met with one another in person by identifying one or more keywords or a set of keywords, which tend to be indicative of in-person meetings between users. For example, the set of keywords may include words and/or phrases such as "I had a nice time," "second date," "seeing you," "our date," "see you again," or any other appropriate words and/or phrases that indicate that an in-person meeting may have taken place. This disclosure contemplates that in certain embodiments, the set of keywords may be stored in memory 130.

As another example, in certain embodiments, meeting detector 140 may determine that user 110A and user 110B likely met with one another by applying a machine-learning algorithm to messages 155 exchanged between user 110A and user 110B. This disclosure contemplates that the machine-learning algorithm may be trained to determine a probability that a first user and a second user likely met, based on a conversation between the two users. For example, the machine-learning algorithm may first be trained on a set of training data that includes previous conversations between multiple pairs of users, where it is known either that the users had met in person, or that the users had never met in person. The machine-learning algorithm may be trained to extract a set of attributes from the conversations and assign weights to such attributes, where the weights indicate the relative degree to which an attribute is probative of the fact that an in-person meeting has taken place between the two users. For example, the set of attributes may include the frequency and number of messages 155 exchanged between users 110A and 110B, the timing of the initial message 155 sent from user 110A to user 110B after user 110A and user 110B first matched on the system, certain keywords contained within messages 155, the day of the week certain messages 155 are exchanged between users 110A and 110B, and/or any other appropriate features. After applying the machine-learning algorithm to messages 155 exchanged between users 110A and 110B, meeting detector 140 may determine that user 110A and user 110B likely met in person, by determining that the probability that user 110A and user 110B likely met in person (as determined by the machine-learning algorithm), is greater than a predefined threshold.

As an additional example, meeting detector 140 may determine that user 110A and user 110B likely met in person by receiving meeting data 160A and 160B, in the form of location data, from user 110A and user 110B, after user 110A and user 110B have exchanged messages 155. For example, in certain embodiments, meeting detector 140 may receive GPS data 160A and 160B from device 115A and device 115B. Meeting detector 140 may then determine that user 110A and user 110B likely met with one another in person, by determining that a location of user 110A at a first time is within a first tolerance of a location of user 110B at a second time, where the first time and the second time are also within a second tolerance of one another.

As a further example, meeting detector 140 may determine that user 110A and user 110B likely met with one another in person by receiving meeting data 160A and/or 160B, in the form of an express indication from user 110A and/or user 110B. For example, in certain embodiments, user 110A and/or user 110B may transmit a message 160A and/or 160B to recommendation tool 105 stating that an in-person meeting took place between user 110A and user 110B. As an example, in certain embodiments, recommendation tool 105 may provide users 110 with a web interface and/or an application interface through which users 110 may communicate with recommendation tool 105 (e.g., send and receive messages 155, receive recommendations 175, notifications 180, and requests 165). The web and/or application interface may include a location where users 110 may indicate to recommendation tool 105 that they had an in-person meeting with another user. For example, in certain embodiments, the web and/or application interface may include a recommendation location where users 110 may view recommendations 175. A user 110A may then indicate that he/she had an in-person meeting with user 110B, who had previously been recommended to him/her, by navigating to the recommendation location and performing an action related to the recommendation of user 110B. For example, user 110A may view the recommendation location on his/her mobile device 115A and gesture on the screen of his/her mobile device 115A on top of the recommendation of user 110B, to indicate that he/she had an in-person meeting with user 110B.

Meeting detector 140 may be a software module stored in memory 130 and executed by processor 125. An example algorithm for meeting detector 140 may contain some of the following or similar steps: set a meeting flag to 0; receive messages 155 exchange between user 110A and user 110B; if messages 155 contain a string of numerical digits with the format XXX-XXX-XXXX, (XXX) XXX-XXXX, XXX-XXXX: {wait a predetermined number of days; set the meeting flag to 1}; else if messages 155 contain one or more keywords of the set of keywords: set the meeting flag to 1; else if a machine-learning algorithm applied to messages 155 returns a probability greater than a predefined threshold: set the meeting flag to 1; else if user 110A sends meeting data 160A to recommendation tool 105 indicating that he/she met in-person with user 110B: set the meeting flag to 1; else: {receive GPS data 160A and 160B; determine that user 110A was at a first location at a first time; determine that user 110B was at a second location at a second time; if the first location and the second location are within a first tolerance and the first time and the second time are within a second tolerance: set the meeting flag to 1; if the meeting flag is set to 1, determine that user 110A and user 110B likely met.

Once meeting detector 140 has determined that user 110A and user 110B likely met with one another in person, recommendation tool 105 may implement meeting assessor 145 to obtain information from users 110A and 110B about their offline meeting. This disclosure contemplates that meeting assessor 145 may obtain information about the offline meeting between users 110A and 110B by first presenting these users with surveys 165A and 165B, and then analyzing responses 170A and 170B submitted by users 110A and 110B in response to the questions presented by surveys 165A and 165B. This disclosure contemplates that surveys 165A and 165B may solicit responses 170A and 170B from users 110A and 110B in any suitable format. For example, surveys 165A and 165B may ask users 110A and 110B to submit answers to questions in the form of multiple-choice selections, drop-down menu selections, yes/no answers, free-form responses, or any other suitable response format.

This disclosure contemplates that surveys 165A and 165B may present the same first question to users 110A and 110B, but that subsequent questions may depend on the responses 170A and 170B submitted by users 110A and 110B to earlier questions. For example, survey 165A may begin by asking user 110A if he/she did, in fact, have an in-person meeting with user 110B. If user 110A answers "no," survey 165A may continue by asking user 110A why he/she has not yet had an in-person meeting with user 110B, and/or if he/she plans to have an in-person meeting with user 110B in the future. On the other hand, if user 110A answers that he/she did in fact have an in-person meeting with user 110B, survey 165A may then continue by asking user 110A if he/she enjoyed his/her meeting with user 110B, and/or if user 110A would like to have a second in-person meeting with user 110B. If user 110A responds in the affirmative, survey 165A may then continue by asking if user 110A would like assistance in setting up a second meeting. On the other hand, if user 110A responds that he/she does not want to have a second in-person meeting, survey 165A may then inquire as to why. For example, survey 165A may ask user 110A to choose a reason from a set of reasons as to why he/she does not want to have a second in-person meeting. Such reasons may include: (A) user 110B's profile information was inaccurate; (B) user 110B behaved inappropriately on the date; (C) user 110B was boring; (D) user 110A was not happy with user 110B's choice of activity for the meeting/date; (E) user 110A did not feel a connection with user 110B, and/or any other suitable response. In certain embodiments, survey 165A may simply ask user 110A to provide a free-form response indicating why he/she does not want to have a second in-person meeting with user 110B.

In certain embodiments, meeting assessor 145 may use response 170A to determine a score for user 110B. For example, in certain embodiments, meeting assessor 145 may assign a positive score to user 110B, if user 110A indicates through response 170A that he/she would like to have a further in-person meeting with user 110B. On the other hand, in certain embodiments, meeting assessor 145 may assign a negative score to user 110B, if user 110A indication through response 170A that he/she does not want to have any further meetings and/or contact with user 110B. In certain embodiments, different scores may be assigned to different categories of reasons as to why user 110A does not want to have any further meetings with user 110B. For example, a score of −1 may indicate that user 110A believes that user 110B's profile information is inaccurate; a score of −2 may indicate that user 110A found user 110B to be boring; a score or −3 may indicate that user 110A was not happy with user 110B's choice of activity for the meeting; a score of −4 may indicate that user 110A simply did not feel a connection with user 110B; a score of −5 may indicate that user 110B behaved inappropriately during the meeting; and a score of −6 may indicate that user 110B lied to user 110A about his/her occupation, education, and/or any other important fact prior to the meeting.

In certain embodiments in which recommendation tool 105 provides users 110 with a web interface and/or an application interface through which users 110 may communicate with recommendation tool 105, meeting assessor 145 may transmit survey 165A to user 110A automatically, the first time user 110A accesses the web and/or application interface after meeting detector 140 has determined that users 110A and 110B likely met. For example, meeting assessor 145 may present survey 165A to user 110A by generating an automatic pop-up on the screen of user 110A's device 115A, after user 110A has accessed the web and/or application interface. In some embodiments, meeting assessor 145 may transmit one or more surveys 165A to user 110A on predefined days of the week, or at predefined time intervals. For example, meeting assessor 145 may transmit surveys 165A to user 110A every 10 days (provided that meeting detector 140 has determined that user 110A likely met another user 110B during those 10 days). In some embodiments, meeting assessor 145 may transmit a notification to user 110A indicating that survey 165A is available within the web and/or application interface for user 110A to access. User 110A may then access survey 165A by logging into the web/application interface and navigating to survey 165A.

Based on responses 170A and 170B provided by users 110A and 110B, meeting assessor 145 may determine whether users 110A and 110B had an in-person meeting and if so, whether the in-person meeting was successful. This disclosure contemplates that meeting assessor may use this information for a variety of different purposes. For example, in certain embodiments, meeting assessor 145 may aggregate this information and use it to provide statistics to users 110. As an example, meeting assessor 145 may transmit notifications 180 to users 110, stating that according to surveys 165, a certain percentage of online conversations facilitated by recommendation tool 105 lead to in-person meetings. As another example, meeting assessor 145 may transmit notifications 180 to users 110, stating that according to surveys 165, choosing a unique location for a first meeting leads to more successful meetings than choosing a chain restaurant.

In certain embodiments, meeting assessor 145 may use responses 170A and 170B to provide tips to users 110 who may have trouble getting other users to agree to initial in-person meetings. For example, meeting assessor 145 may determine that user 110B frequently exchanges his/her phone number with other users, but that less than 10% of such exchanges lead to in-person meetings. Meeting assessor 145 may be able to use responses 170A from users 110A who have chosen not to participate in in-person meetings with user 110B, to determine reasons why user 110B is having difficulty setting up such meetings. Based on this information, meeting assessor 145 may then provide user 110B with tips to overcome these difficulties. As an example, meeting assessor 145 may determine that responses 170A frequently indicate that users 110A view user 110B as insecure from the messages 155 exchanges between users 110A and user 110B. As a result, meeting assessor 145 may present user 110B with tips 180 on ways to appear more confident in conversations.

In certain embodiments, meeting assessor 145 may use responses 170A and 170B to provide tips to users 110B who, while easily setting up initial in-person meetings, may find it challenging to get users 110A to agree to second in-person meetings. For example, responses 170A and 170B may indicate that user 110A and 110B had an in-person meeting, user 110B would like to have a second in-person meeting, but user 110A does not want to have a second in-person meeting. For example, user 110A may indicate through response 170A that user 110B appears to be 10-20 years older in-person than indicated by his/her profile picture. Accordingly, meeting assessor 145 may transmit tips 180 to user 110B suggesting that user 110B update his/her profile picture. As another example, user 110A may indicate through response 170A that he/she decided to meet in-person with user 110B based on the fact that user 110B stated in his/her profile that he/she loved to read; however, during their in-person meeting, user 110B was unable to name the last book he/she had read. Accordingly, meeting assessor 145 may transmit tips 180 to user 110B suggesting that user 110B update his/her activities/interests section on his/her profile by removing activities/interests that he/she does not regularly engage in. As a further example, user 110A may indicate through response 170A that he/she does not want to meet with user 110B a second time, because user 110B took him/her to a fast food restaurant in a dangerous area of town during their first in-person meeting. Accordingly, meeting assessor 145 may transmit tips 180 to user 110B suggesting more appropriate locations for a first in-person meeting.

This disclosure contemplates that meeting assessor 145 may transmit tips 180 to users 110 in any appropriate manner. For example, in certain embodiments, meeting assessor 145 may send tips 180 to users 110 via email, text message, push notification, application message, and/or any other appropriate method.

In certain embodiments, meeting assessor 145 may use responses 170A and 170B to determine that a user 110B likely violated one of the tool's terms of service. For example, response 170A may indicate that user 110B behaved in a grossly inappropriate manner during an in-person meeting with user 110A. As another example, response 170A may indicate that user 110B has provided knowingly false information to recommendation tool 105 for inclusion in his/her profile 110B. For instance, response 170A may indicate that user 110B lied about his/her occupation, education, or any other information on his/her profile, and that user 110A discovered this deceit during the in-person meeting he/she had with user 110B. In such instances, meeting assessor 145 may transmit a notification 180 to user 110B indicating that user 110B will no longer be permitted to communicate with other users 110 through recommendation tool 105.

In certain embodiments, meeting assessor 145 may use responses 170A and 170B to provide users 110A and 110B with feedback about their in-person meetings. For example, if user 110A and 110B both indicate through responses 170A and 170B that they enjoyed their in-person meetings with one another and would like to set up a second in-person meeting, meeting assessor 145 may transmit notifications 180 to users 110A and 110B indicating that the in-person meeting was successful. In some embodiments, notifications 180 may additionally contain offers/suggestions to help users 110A and 110B arrange a second in-person meeting. For example, notifications 180 may present recommendations of highly-rated restaurants located nearby to both user 110A and user 110B. As another example, notifications 180 may present offers to users 110A and 110B to help the users to schedule a second in-person meeting.

Meeting assessor 145 may be a software module stored in memory 130 and executed by processor 125. An example algorithm for meeting assessor 145 may include some or all of the following steps: receive a notification from meeting detector 140 that user 110A and user 110B likely had an in-person meeting; determine that user 110A has accessed a web/application interface supplied by recommendation tool 105; send user 110A survey 165A, the first question of which asks whether user 110A and user 110B did in fact have an in-person meeting; if user 110A indicates that he/she had an in-person meeting with user 110B: {present user 110A with a first set of questions in survey 165A, requesting information about the in-person meeting; determine, based on response 165A whether the in-person meeting was successful; if the in-person meeting was successful, send notification 180 to user 110A, offering to help set up a second in-person meeting; if the in-person meeting was not successful: {determine why the in-person meeting was not successful; if the in-person meeting was not successful because user 110B's profile information is not accurate, send tips 180 to user 110B suggesting that user 110B update his/her profile information; if the in-person meeting was not successful because user 110A was not happy with the location/activity chosen by user 110B for the in-person meeting, send tips 180 to user 110B suggesting alternative locations/activities for future meetings; if the in-person meeting was not successful because user 110B violated one or more of the tool's terms of service, transmit notification 180 to user 110B indicating that user 110B will no longer be permitted to communicate with other users 110 through recommendation tool 105}; if user 110A indicates that he/she did not have an in-person meeting with user 110B, present user 110A with a second set of questions in survey 165A, requesting information as to why user 110A and user 110B did not have an in-person meeting; determine one or more reasons why users 110A and 110B did not have an in-person meeting; if users 110A and 110B did not have an in-person meeting because they have not yet had time to schedule a meeting, transmit notifications 180 offering to help set up an in-person meeting between the users; if users 110A and 110B did not have an in-person meeting because user 110A did not enjoy the online conversation he/she had with user 110B, send user 110B tips 180 for improving online conversations.

In certain embodiments, recommendation tool 105 may additionally include recommendation engine 150. This disclosure contemplates that in certain embodiments, recommendation engine 150 may supply information obtained from responses 170 to a recommendation algorithm used by recommendation engine 150 to generate recommendations of users who are likely to be compatible with one another. In this manner, certain embodiments may increase the likelihood that future user recommendations generated by recommendation engine 150 lead to successful in-person meetings, due in part to feedback provided by responses 170 regarding the success/failure of previous in-person meetings. For example, in certain embodiments, recommendation engine 150 may determine that user 110A and user 110B are likely both compatible with users 110C, 110D, 110E, and 110F based on information stored in user profiles 190A through 190F. However, based on in-person meetings with users 110C through 110F, recommendation engine 150 may learn that user 110A had successful in-person meetings with users 110C and 110D, and unsuccessful in-person meetings with users 110E and 110F, while user 110B had unsuccessful in-person meetings with users 110C and 110D, and successful in-person meetings with users 110E and 110F. This difference in in-person meeting success may be due to the presence of additional personality features of users 110A through 110F that recommendation engine 150 may have been unable to capture from information stored in profiles 190A through 190F. Accordingly, recommendation engine 150 may incorporate the information provided by users 110A and 110B regarding the success of their in-person meetings to refine future recommendations 175 presented to users 110. For example, recommendation engine 150 may choose not to present user 110G as a recommendation 175 to user 110A, despite the fact that user 110A and user 110G appear to be compatible based on information stored in profiles 190A and 190G, because user 110B had a successful in-person meeting with user 110G, suggesting that user 110A will likely not have a successful in-person meeting with user 110G.

This disclosure contemplates that recommendation engine 150 may incorporate information gained from responses 170 into the recommendation algorithm used by recommendation engine 150 in any suitable manner. For example, in certain embodiments, recommendation engine 150 may include a collaborative-filtering algorithm to determine recommendations 175 for users 110. In such embodiments, recommendation engine 150 may determine recommendations 175 for users 110, in part by comparing matching histories 195 of users 110. For example, if recommendation engine 150 determines, based on match histories 195A and 195B, that users 110A and 110B have both chosen to match with a similar group of users in the past (for example, users 110A and 110B have both chosen to match with users 110C through 110E), then if user 110B chooses to match with user 110F, recommendation engine 150 may determine that user 110A is also likely to match with user 110F, based on the similarity between match histories 195A and 195B. Accordingly, recommendation engine 150 may transmit profile 190F of user 110F to user 110A, as a recommendation 175. In such embodiments, recommendation engine 150 may incorporate information gathered from responses 170 into the collaborative filtering algorithm by modifying match histories 195A through 195N, based on the success/failure of in-person meetings arising from the matches stored in match histories 195A through 195N. For example, if user 110A previously matched with user 110B, based on profile 190B of user 110B, but then indicated to recommendation tool 105 (through response 170A) that he/she had an unsuccessful in-person meeting with user 110B, recommendation engine 150 may alter match history 195A to indicate that user 110A did not actually match with user 110B.

In some embodiments, recommendation engine 150 may employ a collaborative filtering algorithm based entirely on information provided by users 110 through responses 170, rather than on match histories 195. For example, recommendation engine 150 may store information about successful/unsuccessful in-person meetings in database 185 and use this information to generate recommendations 175. For example, if user 110A and user 110B have both had successful in-person meetings with a first group of users 110, and unsuccessful in-person meetings with a second group of users 110, then if user 110B has a successful in-person meeting with user 110C, recommendation engine 150 may present profile 190C of user 110C as recommendation 175 to user 110A, on the assumption that if user 110B had a successful in-person meeting with user 110C, user 110A will also likely have a successful in-person meeting with user 110C, based on the similarity between user 110A's and user 110B's in-person meeting histories.

In some embodiments, recommendation engine 150 may employ a machine-learning algorithm to determine recommendations 175. For example, recommendation engine 150 may train the machine-learning algorithm to extract a set of features, based on profiles 190, match histories 195, and/or any other appropriate information, and use these features to determine a probability that a pair of users 110A and 110B may be compatible with one another. In such embodiments, recommendation engine 150 may incorporate the information gained from responses 170 into this algorithm by creating an additional machine-learning feature associated with the success/failure of in-person meetings between users 110 and assigning an appropriate weight to this feature. In this manner, recommendation engine 150 may determine improved recommendations 175, based in part on feedback from users 110 regarding the successes/failures of in-person meetings that the users have participated in.

In some embodiments, recommendation engine 150 may use information gained from responses 170 to provide users 110 with additional information about those users that recommendation engine 150 presents to users 110, as recommendations 175. For example, recommendation engine 150 may present user 110A with a recommendation of user 110B, along with information stating that profile 190B of user 110B is similar to profile 190C of user 110C, with whom user 110A indicated he/she had a successful in-person meeting.

Recommendation engine 150 may be a software module stored in memory 130 and executed by processor 125. An example algorithm for recommendation engine 180 is as follows: extract a set of features from profiles 190, match histories 195, and/or responses 170; apply a machine-learning algorithm to the set of features to determine a probability that user 110B is likely compatible with user 110A; if the probability is greater than a threshold, present user 110A with a recommendation 175 of user 110B.

Processor 125 may be any electronic circuitry, including, but not limited to microprocessors, application specific integrated circuits (ASIC), application specific instruction set processor (ASIP), and/or state machines, that communicatively couples to memory 130 and interface 135 and controls the operation of recommendation tool 105. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of recommendation tool 105 by processing information received from network 120, device(s) 115, interface 135, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Interface 135 represents any suitable device operable to receive information from network 120A, transmit information through network 120A, perform suitable processing of the information, communicate to other devices, or any combination of the preceding. For example, interface 135 transmits requests 165, recommendations 175, and/or notifications 180 to devices 115. As another example, interface 135 receives meeting data 160 and/or responses 170 from devices 115. As a further example, interface 135 may facilitate the exchange of messages 155 between users 110A and 110B, by receiving message 155 transmitted by user 110A for ultimate receipt by user 110B and then transmitting message 155 to user 110B. Interface 135 represents any port or connection, real or virtual, including any suitable hardware and/or software, including protocol conversion and data processing capabilities, to communicate through a LAN, WAN, or other communication systems that allows recommendation tool 105 to exchange information with devices 115 and/or other components of system 100 via network 120A.

As mentioned above, database 185 may store a set of user profiles 190. User profiles 190 define or represent features of users 110. Profiles 190 may be available to the general public, to those that are members of the online dating system, and/or to a specific category of those members of the online dating system. Profiles 190 may contain information that was solicited from users 110 when users 110 set up their online dating accounts or was otherwise input by such users into their profiles. Profiles 190 may include general information such as age, height, gender, and occupation, as well as detailed information that may include the users' interests, likes/dislikes, personal feelings, and/or outlooks on the world.

In certain embodiments, database 185 may also store a set of match histories 195. For a given user 110A, match history 195A may indicate those users 110B, presented to user 110A as recommendations 175, and with whom user 110A chose to match. In some embodiments, and as described above, recommendation tool 105 may modify match histories 195 based on feedback provided by responses 170. For example, if user 110A chose to match with user 110B, but later indicates that he/she participated in an in-person meeting with user 110B which was not successful (i.e., user 110A may indicate through response 170A that he/she does not wish to participate in any further in-person meetings with user 110B), then recommendation tool 105 may update match history 195A to indicate that user 110A did not actually match with user 110B.

In certain embodiments, by determining that users 110 likely participated in in-person meetings with other users and soliciting information about these in-person meetings through requests 165, recommendation tool 105 may help to improve the online matching experiences of users 110 in a number of different ways. For example, certain embodiments may provide dating and/or communication tips to those users who are unable to secure offline dates with their online matches, to help those users secure future dates. As another example, certain embodiment may provide tips on ways to improve profile information and/or suggestions for conversation topics, meeting locations, and/or meeting activities, to help enable users to secure additional in-person meetings following an initial in-person meeting. As another example, certain embodiments may enable a user to report another user for violating the system's terms of service based on inaccurate/deceitful profile information provided to the system by the other user, or grossly inappropriate behavior of the other users, thereby helping to protect the health/safety of users 110. As a further example, certain embodiments may provide enhanced recommendations 175 based in part on feedback provided by the offline dating experiences of the system's users.

Modifications, additions, or omissions may be made to the systems described herein without departing from the scope of the invention. For example, system 100 may include any number of users 110, devices 115, networks 120A and 120B, and databases 185. The components may be integrated or separated. Moreover, the operations described above may be performed by more, fewer, or other components. Additionally, the operations may be performed using any suitable logic comprising software, hardware, and/or other logic. As used in this document, "each" refers to each member of a set or each member of a subset of a set.

Figure 2:
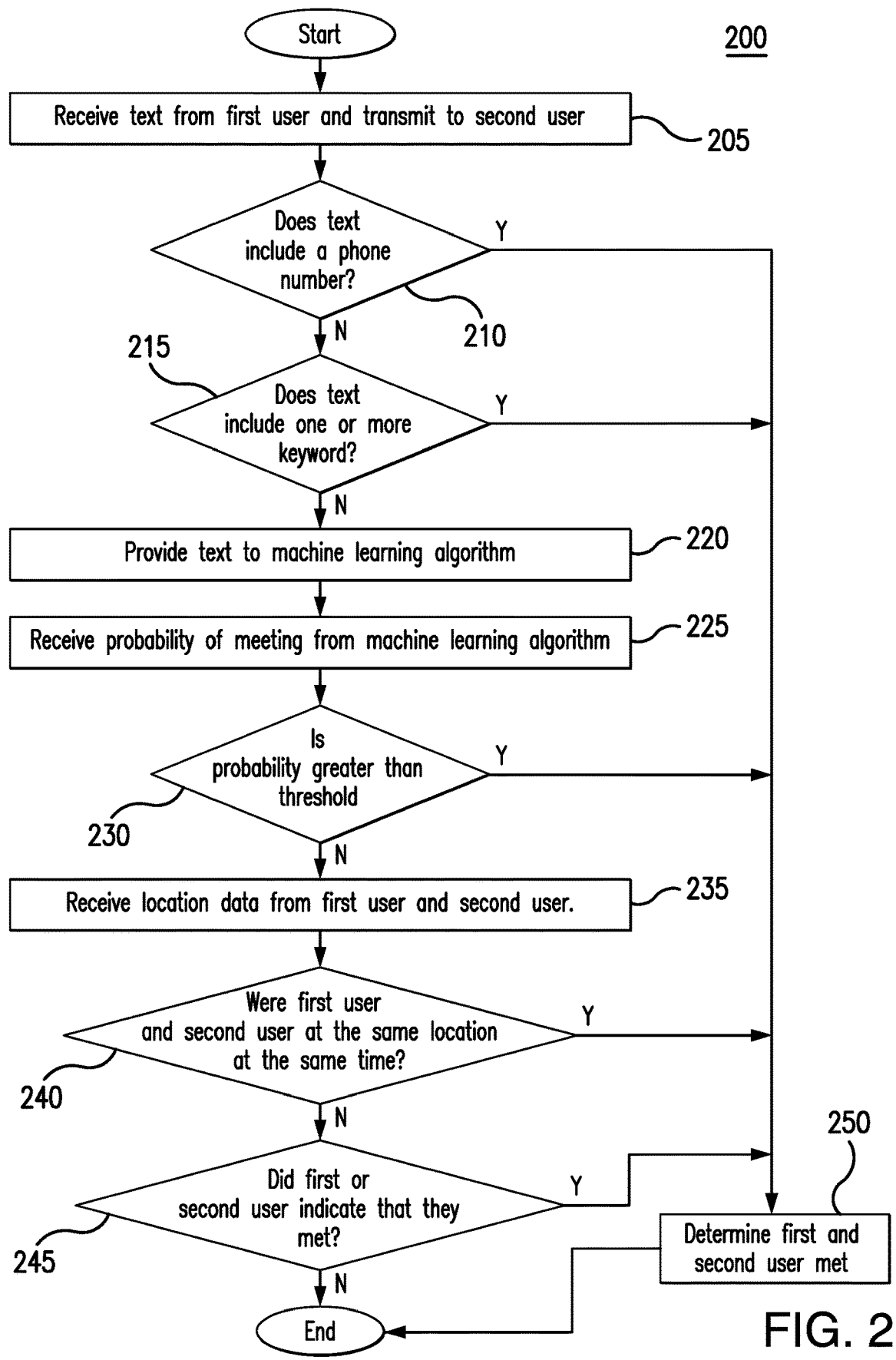
FIG. 2 presents a flowchart illustrating a method by which the recommendation tool of the system of FIG. 1 may determine that a pair of users likely met with one another offline.

FIG. 2 presents a flowchart illustrating a method by which recommendation tool 105 may determine that a pair of users likely met with one another in person. In step 205, recommendation tool 105 receives message 155 from first user 110A and transmits message 155 to second user 110B. This disclosure contemplates that message 155 may include text, video, pictures, or any combination of text, video, and/or pictures. In step 210, recommendation tool 105 determines whether message 155 includes a phone number or other contact information. This disclosure contemplates that recommendation tool 105 may determine that message 155 includes a phone number in any suitable manner. For example, recommendation tool 105 may examine message 155 to determine whether message 155 contains a string of numerical digits with the format XXX-XXX-XXXX, (XXX) XXX-XXXX, XXX-XXXX, or any other similar format of digits. As another example, recommendation tool 105 may examine message 155 to determine whether message 155 contains a word or phrase associated with a contact information exchange, such as "call me," "my number is," "my phone number," or any other suitable phrase that may be associated with a contact information exchange. If recommendation tool 105 determines that message 155 includes a phone number or other contact information, recommendation tool 105 may wait a pre-determined number of days and then determine that user 110A and user 110B likely met, in step 250. This disclosure contemplates that recommendation tool 105 may wait any number of days before determining that user 110 and user 110B likely met. For example, in certain embodiments, recommendation tool 105 may wait three days. In some embodiments, recommendation tool 105 may wait five days.

If, in step 210, recommendation tool 105 determines that message 155 does not include a phone number or contact information, in step 215, recommendation tool 105 determines whether message 155 contains one or more keywords of a set of keywords. If recommendation tool 105 determines that message 155 contains one or more keywords of the set of keywords, then in step 250, recommendation tool 105 determines that user 110A and user 110B likely met. This disclosure contemplates that the set of keywords includes keywords which tend to be indicative of in-person meetings between users. For example, the set of keywords may include words and/or phrases such as "I had a nice time," "second date," "seeing you," "our date," "see you again," or any other words and/or phrases indicating that the two may have met. This disclosure contemplates that in certain embodiments, the set of keywords may be stored in memory 130.

If, in step 215, recommendation tool 105 determines that message 155 does not contain one or more keywords of the set of keywords, in step 210, recommendation tool 105 provides message 155 to a machine-learning algorithm. This disclosure contemplates that the machine-learning algorithm may be trained to determine a probability that user 110A and user 110B likely met, based on a conversation between the two users. For example, the machine-learning algorithm may first be trained on a set of training data that includes previous conversations between multiple pairs of users, where it is known either that the users had met in person, or that the users had not met in person. The machine-learning algorithm may be trained to extract a set of attributes from the conversations and assign weights to such attributes, where the weights indicate the relative degree to which an attribute is probative of the fact that a meeting has taken place between the two users. For example, the set of attributes may include the frequency and number of messages 155 exchanged between users 110A and 110B, the timing of the initial message 155 sent from user 110A to user 110B after user 110A and user 110B first matched, certain keywords contained within messages 155, the day of the week certain messages 155 are exchanged between users 110A and 110B, and/or any other appropriate features. After applying the machine-learning algorithm to messages 155 exchanged between users 110A and 110B, recommendation tool 105 may obtain a probability that user 110A and user 110B likely met in person, in step 225. In step 230, recommendation tool 105 may determine whether the probability is greater than a predefined threshold. If, in step 230, recommendation tool 105 determines that the probability is greater than the predefined threshold, then in step 250, recommendation tool 105 determines that user 110A and user 110B likely met.

If, in step 230, recommendation tool 105 determines that the probability is not greater than the predefined threshold, in step 235, recommendation tool 105 receives meeting data 160A and 160B, in the form of location data, from user 110A and user 110B. In step 240, recommendation tool 105 uses meeting data 160A and 160B to determine whether user 110A and user 110B were at approximately the same location at approximately the same time. For example, recommendation tool 105 may receive a location for user 110A at a first time, and a location for user 110B, at a second time. Recommendation tool 105 may then determine whether the location of user 110A at the first time is within a first tolerance of the location of user 110B at the second time, and also whether the first time and the second time are also within a second tolerance of one another. If, in step 240, recommendation tool determines that user 110A and user 110B were at approximately the same location at approximately the same time, in step 250, recommendation tool 105 determines that user 110A and user 110B likely met.

If, in step 240, recommendation tool 105 determines that user 110A and user 110B were not at approximately the same location at approximately the same time, in step 245, recommendation tool 105 determines whether user 110A and/or user 110B sent meeting data 160A and/or 160B to recommendation tool 105 expressly indicating that user 110A and user 110B met. As an example, in certain embodiments, recommendation tool 105 may provide users 110 with a web interface and/or an application interface through which users 110 may communicate with recommendation tool 105 (i.e., send and receive messages 155, receive recommendations 175, notifications 180, and requests 165). The web and/or application interface may include a location where users 110 may indicate to recommendation tool 105 that they had an in-person meeting with another user. For example, in certain embodiments, the web and/or application interface may include a recommendation location where users 110 may view recommendations 175. A user 110A may then indicate that he/she had an in-person meeting with user 110B, who had previously been recommended to him/her, by navigating to the recommendation location and performing an action related to the recommendation of user 110B. For example, user 110A may view the recommendation location on his/her mobile device 115A and gesture on the screen of his/her mobile device 115A on top of the recommendation of user 110B, to indicate that he/she had an in-person meeting with user 110B. If, in step 245, recommendation tool 105 receives an express indication 160A and/or 160B from user 110A and/or user 110B that user 110A and user 110B met, then in step 250, recommendation tool 105 determines that user 110A and user 110B likely met.

Modifications, additions, or omissions may be made to method 200 depicted in FIG. 2. Method 200 may include more, fewer, or other steps. For example, steps may be performed in parallel or in any suitable order. While discussed as recommendation tool 105 (or components thereof) performing the steps, any suitable component of system 100, such as device(s) 115 for example, may perform one or more steps of the method.

Figure 3:
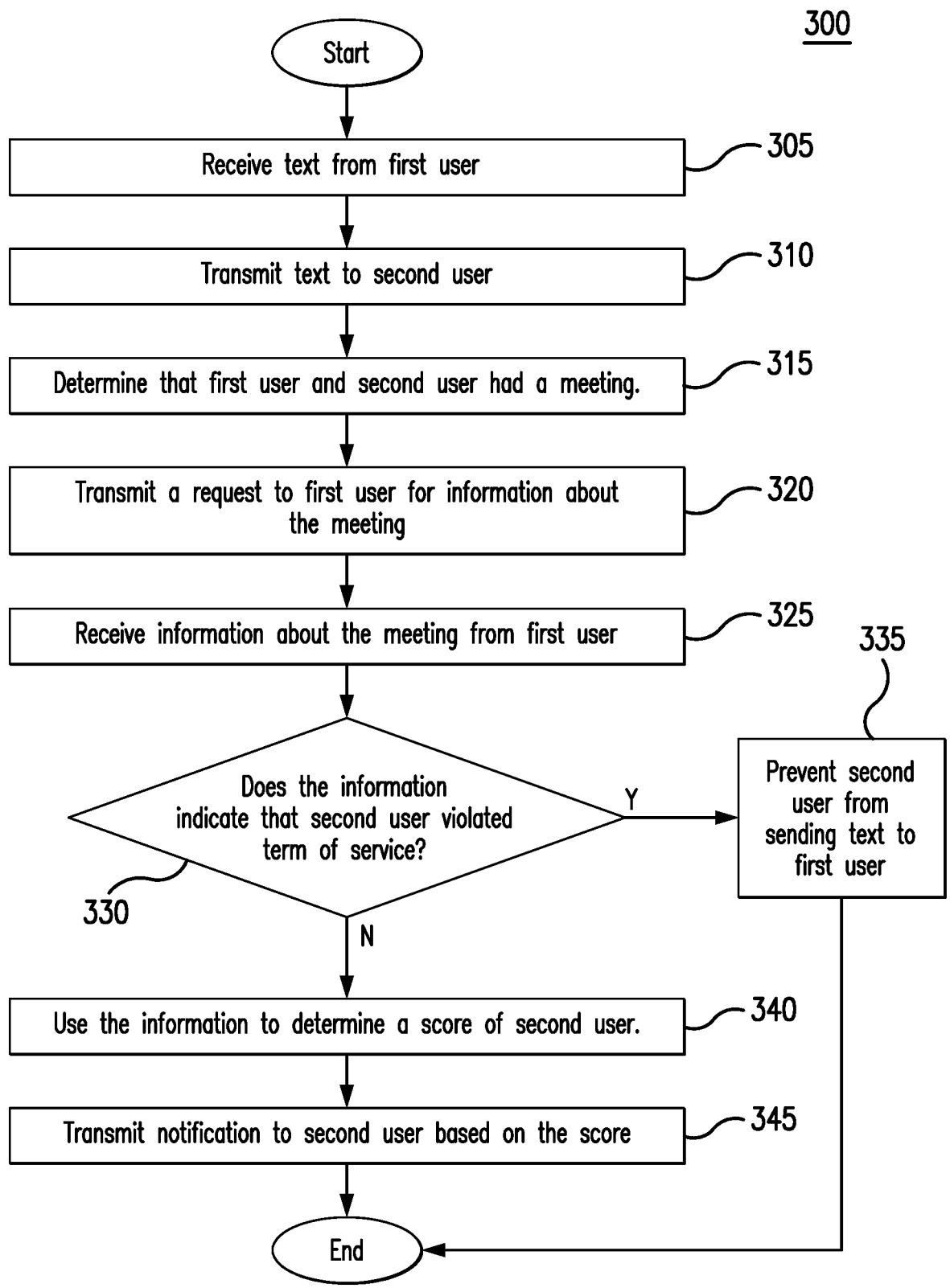
FIG. 3 presents a flowchart illustrating a method by which the recommendation tool of the system of FIG. 1 may request information about a meeting between a pair of users and use this information to provide dating tips to one or both of the users and/or help facilitate future dates between the users.

FIG. 3 presents a flowchart illustrating a method by which recommendation tool 105 requests information about a likely meeting between a pair of users and uses this information to provide dating tips to one or both of the users and/or to help facilitate future dates between the users. In step 305, recommendation tool 105 receives message 155 from first user 110A. In step 310, recommendation tool 105 transmits message 155 to second user 110B. In step 315, recommendation tool 105 uses message 155 to determine that first user 110A and second user 110B likely had an offline meeting together, as described in detail above, in the discussion of FIG. 2. In response to determining that first user 110A and second user 110B likely had the meeting together, in step 320, recommendation tool 105 transmits requests 165A and 165B to users 110A and 110B seeking information about the meeting. For example, in certain embodiments, requests 165A and 165B may take the form of surveys provided to users 110A and 110B. In step 325, recommendation tool 105 receives responses 170A and 170B submitted by users 110A and 110B, in response to the questions presented by surveys 165A and 165B. This disclosure contemplates that surveys 165A and 165B may solicit responses 170A and 170B from users 110A and 110B in any suitable format. For example, surveys 165A and 165B may ask users 110A and 110B to submit answers to questions in the form of multiple-choice selections, drop-down menu selections, yes/no answers, free-form responses, or any other suitable response format.

This disclosure contemplates that surveys 165A and 165B may present the same first question to users 110A and 110B, but that subsequent questions may depend on the responses 170A and 170B submitted by users 110A and 110B to earlier questions. For example, survey 165A may begin by asking user 110A if he/she did, in fact, have an in-person meeting with user 110B. If user 110A answers "no," survey 165A may continue by asking user 110A why he/she has not yet had an in-person meeting with user 110B, or if he/she plans to have an in-person meeting with user 110B in the future. On the other hand, if user 110A answers that he/she did in fact have an in-person meeting with user 110B, survey 165A may then continue by asking user 110A if he/she enjoyed his/her meeting with user 110B, and/or if user 110A would like to have a second in-person meeting with user 110B. If user 110A responds in the affirmative, survey 165A may then continue by asking if user 110A would like assistance in setting up a second meeting. On the other hand, if user 110A responds that he/she does not want to have a second in-person meeting, survey 165A may then inquire as to why. For example, survey 165A may ask user 110A to choose a reason from a set of reasons as to why he/she does not want to have a second in-person meeting. Such reasons may include: (A) user 110B's profile information was inaccurate; (B) user 110B behaved inappropriately on the date; (C) user 110B was boring; (D) user 110A was not happy with user 110B's choice of activity for the meeting/date; (E) user 110A did not feel a connection with user 110B, and/or any other suitable response. In certain embodiments, survey 165A may simply ask user 110A to provide a free-form response indicating why he/she does not want to have a second in-person meeting with user 110B.

In step 330, recommendation tool 105 may use response 170A to determine whether user 110B violated one or more of recommendation tool 105's terms of service. For example, response 170A may indicate that user 110B behaved in a grossly inappropriate manner during the meeting and/or lied to user 110A about his/her occupation, education, and/or any other important fact prior to the meeting. If in step 330, recommendation tool 105 determines that user 110B likely violated one or more terms of service, in step 335 recommendation tool 105 may prevent user 110B from further contacting user 110A, and/or contacting any other users 110.

If in step 330, recommendation tool 105 determines that user 110B likely did not violate one or more terms of service, in step 340 recommendation tool 105 may use response 170A to determine a score to assign to user 110B. For example, a score of −1 may indicate that user 110A believes that user 110B's profile information is inaccurate; a score of −2 may indicate that user 110A found user 110B to be boring; a score or -3 may indicate that user 110A was not happy with user 110B's choice of activity for the meeting; and a score of −4 may indicate that user 110A simply did not feel a connection with user 110B; a score of −5 may indicate that user 110B behaved poorly during the meeting. This disclosure contemplates that recommendation tool 105 may use any appropriate scoring system to assign a score to user 110B. Additionally, this disclosure contemplates that determining a score of second user 110B may simply include assigning user 110B to a category of a set of categories, where each category of the set of categories includes one or more reasons why an in-person meeting did not succeed.

In step 345, recommendation tool 105 may use the score determined for user 110B in step 340 to send a notification 180 to user 110B. For example, in certain embodiments in which the score indicates that user 110A would like to participate in a further in-person meeting with user 110B, notification 180 may provide an indication to user 110B that the in-person meeting was a success. In some embodiments, notifications 180 may additionally contain offers/suggestions to help users 110A and 110B arrange a second in-person meeting. For example, notifications 180 may present recommendations of highly-rated restaurants located nearby to both user 110A and user 110B. As another example, notifications 180 may present offers to users 110A and 110B to help the users to schedule a second in-person meeting.

In certain embodiments in which the score indicates that user 110A does not want to participate in a further in-person meeting with user 110B, notification 180 may provide tips on ways to improve in-person meetings, ways to improve profile 190B of user 110B, location/activity suggestions for further meetings with other users 110, and/or any other information/suggestions that may help user 110B to have more successful meetings with other users 110 in the future.

Modifications, additions, or omissions may be made to method 300 depicted in FIG. 3. Method 300 may include more, fewer, or other steps. For example, steps may be performed in parallel or in any suitable order. While discussed as recommendation tool 105 (or components thereof) performing the steps, any suitable component of system 100, such as device(s) 115 for example, may perform one or more steps of the method.

Figure 4:
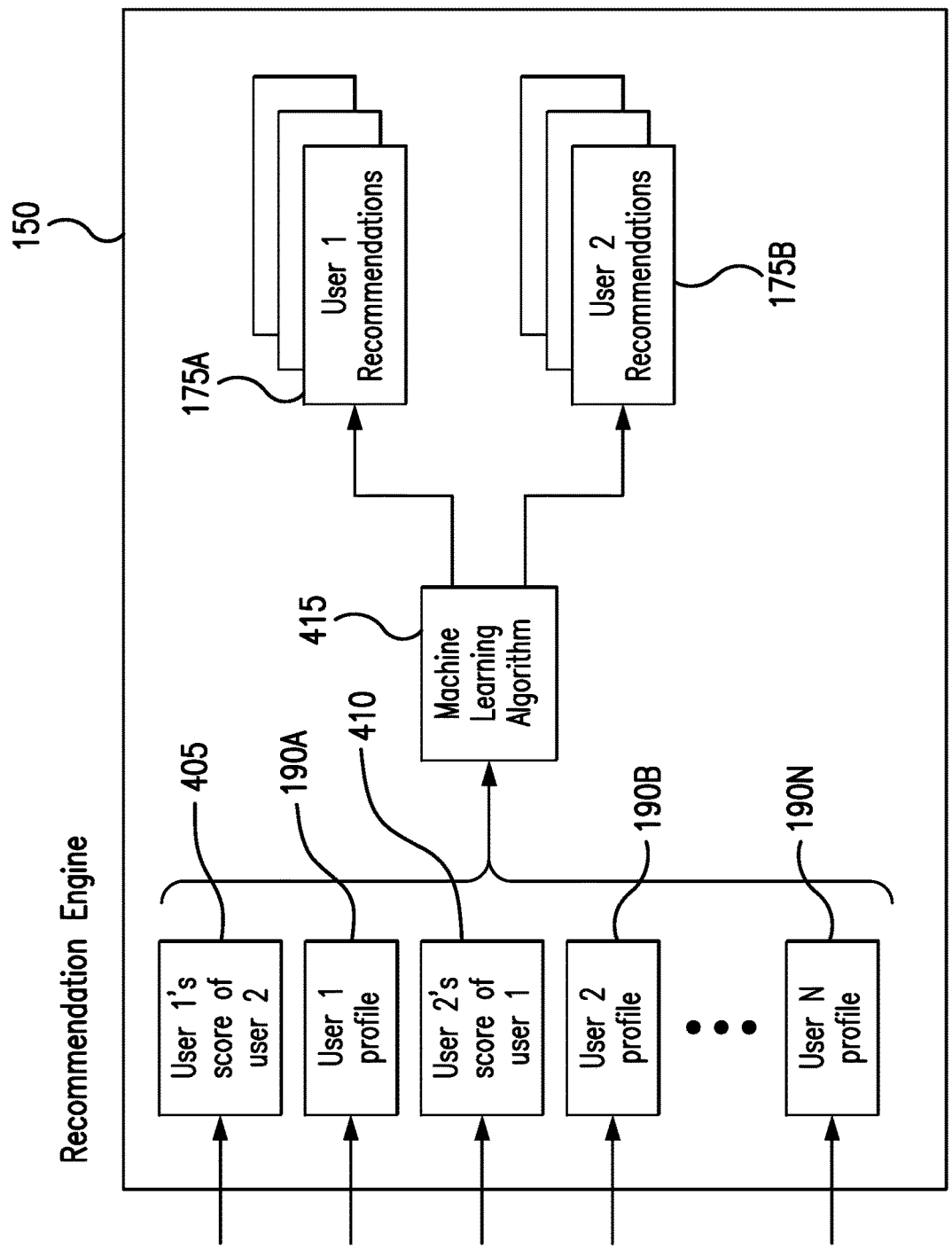
FIG. 4 illustrates the recommendation engine of the recommendation tool of the system of FIG. 1.

FIG. 4 illustrates an example recommendation engine 150. This disclosure contemplates that in certain embodiments, recommendation engine 150 may supply information obtained from responses 170 to a recommendation algorithm used by recommendation engine 150 to generate recommendations of users who are likely to be compatible with one another. In this manner, certain embodiments may increase the likelihood that future user recommendations generated by recommendation engine 150 lead to successful in-person meetings, due in part to feedback provided by responses 170 regarding the success/failure of previous in-person meetings.

In certain embodiments, and as illustrated in FIG. 4, recommendation engine 150 may employ machine-learning algorithm 415 to determine recommendations 175. For example, recommendation engine 150 may train the machine-learning algorithm to extract a set of features, based on profiles 190, scores 405 and 410 (determined based on responses 170A and 170B, and providing an assessment of user 110B by user 110A and user 110A by user 110B, respectively), and/or any other appropriate information, and use these features to determine a probability that a pairs of users 110 may be compatible with one another. In such embodiments, recommendation engine 150 may incorporate scores 405 and 410 into this algorithm by creating an additional machine-learning feature associated with these scores and assigning an appropriate weight to this feature. In this manner, recommendation engine 150 may determine improved recommendations 175, based in part on feedback from users 110 regarding the successes/failures of in-person meetings that the users have participated in.

This disclosure contemplates that recommendation engine 150 may incorporate information gained from responses 170A and 170B into its recommendation algorithm in any appropriate manner. For example, in certain embodiments, recommendation engine 150 may include a collaborative filtering algorithm used to determine recommendations 175 for users 110. In such embodiments, recommendation engine 150 may determine recommendations 175 for users 110, in part by comparing matching histories 195 of users 110. For example, if recommendation engine 150 determines, based on match histories 195A and 195B, that users 110A and 110B have both chosen to match with a similar group of users in the past (for example, users 110A and 110B have both chosen to match with users 110C through 110E), then if user 110B chooses to match with user 110F, recommendation engine 150 may determine that user 110A is also likely to match with user 110F, based on the similarity between match histories 195A and 195B. Accordingly, recommendation engine 150 may transmit profile 190F of user 110F to user 110A, as a recommendation 175. In such embodiments, recommendation engine 150 may incorporate information gathered from responses 170 into the collaborative filtering algorithm by modifying match histories 195A through 195N, based on the success/failure of in-person meetings arising from the matches stored in match histories 195A through 195N. For example, if user 110A previously matched with user 110B, based on profile 190B of user 110B, but then indicated to recommendation tool 105 (through response 170A) that he/she had an unsuccessful in-person meeting with user 110B, recommendation engine 150 may alter match history 195A to indicate that user 110A did not actually match with user 110B.

In some embodiments, recommendation engine 150 may employ a collaborative filtering algorithm based on information provided by users 110 through responses 170, rather than on match histories 195. For example, recommendation engine 150 may store information about successful/unsuccessful in-person meetings in database 185 and use this information to generate recommendations 175. For example, if user 110A and user 110B have both had successful in-person meetings with a first group of users 110, and unsuccessful in-person meetings with a second group of users 110, then if user 110B has a successful in-person meeting with user 110C, recommendation engine 150 may present profile 190C of user 110C as recommendation 175 to user 110A. Recommendation engine 150 may present profile 190C as recommendation 175 to user 110A, based on the assumption that if user 110B had a successful in-person meeting with user 110C, user 110A will also likely have a successful in-person meeting with user 110C, based on the similarity between user 110A's and user 110B's in-person meeting histories.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A method executed by at least one hardware processor comprising the steps of:
    receiving, using an interface operably coupled with the at least one hardware processor and configured to send and receive data over a network, messages from a first user to a second user;
    determining, based at least in part on the messages, that the first user and the second user had an in-person meeting, wherein determining that the first user and the second user had the in-person meeting comprises:
        applying an algorithm to the messages to determine a probability that the first user and the second user had an in-person meeting, wherein the algorithm is trained on a set of training data that comprises historical messages between multiple pairs of users, wherein each of the historical messages is labeled with whether the in-person meeting took place between a respective pair of users or not;
        extracting, by applying the algorithm, a set of attributes from the messages between the first user and the second user, wherein the set of attributes comprises at least one of:
            a frequency of messages exchanged between the first user and the second user,
            a number of messages exchanged between the first user and the second user,
            a timing of each message sent from the first user to the second user after the first user and the second user were matched,
            at least one certain keyword contained within the exchanged messages, or
            a day of a week when certain messages were exchanged between the first user and the second user; and
        assigning a set of weights to the set of attributes, wherein the set of weights indicates a degree of probability that the in-person meeting has occurred between the first user and the second user; and
        determining that the degree of probability is greater than a threshold;
    transmitting, using the interface, a request to the first user for a first set of data about the in-person meeting between the first user and the second user, the first set of data being associated with a survey comprising a set of questions;
    receiving, using the interface, the first set of data from the first user, the first set of data comprising one or more responses associated with the set of questions;
    determining, based at least in part on the first set of data, a score of the second user that indicates the first user's desire for a subsequent in-person meeting with the second user, wherein determining the score comprises:
        assigning a respective score to one or more categories of reasons for declining or accepting the subsequent in-person meeting;
        analyzing the one or more responses to determine a reason provided by the first user for declining or accepting the subsequent in-person meeting; and
        determining that the determined reason belongs to a category to which the score was assigned;
    in response to determining the score of the second user:
        updating a recommendation algorithm based on the score; and
        transmitting, using the interface, a notification, based on the score, to the first user; and
    generating, by executing the updated recommendation algorithm, an improved recommendation of a third user to the first user.

2. The method of claim 1, wherein determining that the first user and the second user had the in-person meeting comprises determining that the message received from the first user comprises a phone number.

3. The method of claim 1, wherein determining that the first user and the second user had the in-person meeting comprises:
    receiving location information from the first user indicating a location of the first user at a first time;
    receiving location information from the second user indicating a location of the second user at a second time;
    determining that the location of the first user at the first time is within a first tolerance of the location of the second user at the second time; and
    determining that the first time is within a second tolerance of the second time.

4. The method of claim 1, wherein determining that the first user and the second user had the in-person meeting comprises receiving at least one of an indication from the first user that the first user and the second user had the in-person meeting and an indication from the second user that the first user and the second user had the in-person meeting.

5. The method of claim 1, wherein determining that the first user and the second user had the in-person meeting comprises locating at least one keyword of a set of keywords in the message received from the first user, the set of keywords comprising keywords indicating that the first user and the second user are planning to meet.

6. The method of claim 1, wherein the notification comprises at least one of a way to improve a user profile and a way to improve a date.

7. The method of claim 1, further comprising:
    determining that the first set of data indicates that the second user violated a term of service; and
    in response to determining that the first set of data indicates that the second user violated the term of service, preventing the second user from transmitting a second message destined for a fourth user.

8. The method of claim 1, further comprising:
    determining that the first set of data indicates that the second user violated a term of service; and in response to determining that the first set of data indicates that the second user violated the term of service, terminating a service of the second user.

9. The method of claim 1, further comprising:
determining, based on the score of the second user, a recommendation of a fourth user for a fifth user, wherein determining the recommendation of the fourth user for the fifth user comprises implementing the updated recommendation algorithm adapted to determine, based in part on a set of features comprising the score of the second user, a set of recommendations among a set of users; and
presenting a profile of the fourth user to the fifth user.

10. The method of claim 1, further comprising:
receiving a second message from the first user;
transmitting the second message to the third user;
determining, based at least in part on the second message, that the first user and the third user had a second in-person meeting;
transmitting a second request to the first user for a second set of data, the second set of data comprising information about the second in-person meeting between the first user and the third user;
receiving the second set of data from the first user;
determining, based on the second set of data, a second score of the third user;
determining, based in part on the score and the second score, a recommendation of a fourth user for the first user; and
presenting a profile of the fourth user to the first user.

11. An apparatus comprising:
an interface configured to send and receive data over a network; and
a hardware processor operably coupled to the interface, and configured to:
receive, using the interface, a message from a first user to a second user;
determine, based at least in part on the message, that the first user and the second user had an in-person meeting, wherein determining that the first user and the second user had the in-person meeting comprises:
applying an algorithm to the message to determine a probability that the first user and the second user had an in-person meeting; and
determining that the probability is greater than a threshold;
transmit, using the interface, a request to the first user for a first set of data about the in-person meeting between the first user and the second user, the first set of data being associated with a survey comprising a set of questions;
receive, using the interface, the first set of data from the first user, the first set of data comprising one or more responses associated with the set of questions;
determine, based at least in part on the first set of data, a score of the second user that indicates the first user's desire for a subsequent in-person meeting with the second user, wherein determining the score, the hardware processor is configured to:
assign a respective score to one or more categories of reasons for declining or accepting the subsequent in-person meeting;
analyze the one or more responses to determine a reason provided by the first user for declining or accepting the subsequent in-person meeting; and
determine that the determined reason belongs to a category to which the score was assigned;
in response to determining the score of the second user:
update a recommendation algorithm based on the score; and
transmit, using the interface, a notification, based on the score, to the first user; and
generate, by executing the updated recommendation algorithm, an improved recommendation of a third user to the first user.

12. The apparatus of claim 11, wherein determining that the first user and the second user had the in-person meeting comprises determining that the message received from the first user comprises a phone number.

13. The apparatus of claim 11, wherein determining that the first user and the second user had the in-person meeting at the location comprises:
receiving location information from the first user indicating a location of the first user at a first time;
receiving location information from the second user indicating a location of the second user at a second time;
determining that the location of the first user at the first time is within a first tolerance of the location of the second user at the second time; and
determining that the first time is within a second tolerance of the second time.

14. The apparatus of claim 11, wherein determining that the first user and the second user had the in-person meeting comprises receiving at least one of an indication from the first user that the first user and the second user had the in-person meeting and an indication from the second user that the first user and the second user had the in-person meeting.

15. The apparatus of claim 11, further comprising a memory configured to store a set of keywords, wherein determining that the first user and the second user had the in-person meeting comprises locating at least one keyword of the set of keywords in the message received from the first user, the set of keywords comprising keywords indicating that the first user and the second user are planning to meet.

16. The apparatus of claim 11, wherein:
the processor is further configured to train the algorithm with a set of training data that comprises historical messages between multiple pairs of users, wherein each of the historical messages is labeled with whether the in-person meeting took place between a respective pair of users or not to determine a probability that the first user and the second user had the in-person meeting, based on at least the message received from the first user; and
determining that the first user and the second user had the in-person meeting comprises:
extracting, by applying the algorithm, at least one attribute from the message between the first user and the second user, wherein the at least one attribute comprises at least one of:
a frequency of messages exchanged between the first user and the second user,
a number of messages exchanged between the first user and the second user,
a timing of the message sent from the first user to the second user after the first user and the second user were matched,
at least one certain keyword contained within the exchanged messages, or a day of a week when certain messages were exchanged between the first user and the second user; and assigning a set of weights to the set of attributes, wherein the set of weights indicates a degree of probability of the in-person meeting has occurred between the first user and the second user.

17. The apparatus of claim 11, wherein the notification comprises at least one of a way to improve a user profile and a way to improve a date.

18. The apparatus of claim 11, wherein the processor is further configured to:

determine that the first set of data indicates that the second user violated a term of service; and in response to determining that the first set of data indicates that the second user violated the term of service, prevent the second user from transmitting a second message destined for a fourth user.

19. The apparatus of claim 11, wherein the processor is further configured to:

determine that the first set of data indicates that the second user violated a term of service; and in response to determining that the first set of data indicates that the second user violated the term of service, terminate a service of the second user.

20. The apparatus of claim 11, further comprising a database configured to store a set of profiles, wherein the processor is further configured to:

Determine, based on the score of the second user, a recommendation of a fourth user for a fifth user, wherein determining the recommendation of the fourth user for the fifth user comprises implementing the updated recommendation algorithm adapted to determine, based in part on a set of features comprising the score of the second user, a set of recommendations among a set of users; and present a profile of the fourth user to the fifth user.

21. The apparatus of claim 11, wherein the processor is further configured to:

receive, using the interface, a second message from the first user;

transmit, using the interface, the second message to the third user;

determine, based at least in part on the second message, that the first user and the third user had a second in-person meeting;

transmit, using the interface, a second request to the first user for a second set of data, the second set of data comprising information about the second in-person meeting between the first user and the third user;

receive, using the interface, the second set of data from the first user;

determine, based on the second set of data, a second score of the third user;

determine, based in part on the score and the second score, a recommendation of a fourth user for the first user; and present a profile of the fourth user to the first user.

* * * * *